(12) United States Patent
Zhang et al.

(10) Patent No.: US 9,513,371 B2
(45) Date of Patent: Dec. 6, 2016

(54) GROUND SURVEY AND OBSTACLE DETECTION SYSTEM

(71) Applicant: Identified Technologies Corporation, Belle Mead, NJ (US)

(72) Inventors: Richard Yang Zhang, Belle Mead, NJ (US); Andy Wu, Lexington, MA (US); Kelsey Denelle Duncombe-Smith, Houston, TX (US)

(73) Assignee: Identified Technologies Corporation, Pittsburgh, PA (US)

(*) Notice: Subject to any disclaimer, the term of this patent is extended or adjusted under 35 U.S.C. 154(b) by 783 days.

(21) Appl. No.: 13/832,540

(22) Filed: Mar. 15, 2013

(65) Prior Publication Data

US 2016/0097851 A1    Apr. 7, 2016

Related U.S. Application Data

(60) Provisional application No. 61/771,054, filed on Feb. 28, 2013.

(51) Int. Cl.
| | |
|---|---|
| *G01S 13/88* | (2006.01) |
| *B64C 39/02* | (2006.01) |
| *B64F 1/02* | (2006.01) |
| *G05D 1/10* | (2006.01) |

(52) U.S. Cl.
CPC ............ *G01S 13/885* (2013.01); *B64C 39/024* (2013.01); *B64F 1/02* (2013.01); *G05D 1/10* (2013.01); *B64C 2201/066* (2013.01); *B64C 2201/182* (2013.01)

(58) Field of Classification Search
CPC ........ G01S 13/885; G01S 13/89; G01S 13/88; G01S 7/003; G05D 1/0027; G05D 2201/0209; G05D 1/042; G05D 1/0257; G05D 2201/0207; G08G 5/0069
USPC .................. 342/22, 58, 62–63, 66
See application file for complete search history.

(56) References Cited

U.S. PATENT DOCUMENTS

| | | | |
|---|---|---|---|
| 3,745,575 A | 7/1973 | Kikuchi | |
| 5,068,669 A | 11/1991 | Koert et al. | |
| 5,310,134 A * | 5/1994 | Hsu ............................ | F41G 7/32 244/3.12 |
| 5,722,618 A * | 3/1998 | Jacobs ...................... | B64D 9/00 244/137.1 |
| 6,119,976 A * | 9/2000 | Rogers .................. | B64C 39/024 244/13 |
| 6,739,556 B1 * | 5/2004 | Langston ............ | B64D 45/0015 244/189 |

(Continued)

FOREIGN PATENT DOCUMENTS

| | | | | |
|---|---|---|---|---|
| DE | EP 2241896 A1 * | 10/2010 | ............. | A63H 27/04 |
| GB | 2511754 A * | 9/2014 | ............... | G01T 7/00 |

*Primary Examiner* — John B Sotomayor
(74) *Attorney, Agent, or Firm* — Coats & Bennett, P.L.L.C.

(57) ABSTRACT

The present disclosure is directed to a ground survey and obstacle detection system using one or multiple detection devices, such as aerial detection devices. Aerial detection devices are sent ahead of the primary vehicle to survey a territory and map out any obstacles. The aerial detection device is equipped with sensors to scan the ground below it and detect obstacles. The aerial detection device is not affected by or prone to triggering dangerous obstacles. The aerial detection device flies above the ground and may be configured to send a signal back alerting the primary vehicle to the existence of obstacles.

18 Claims, 9 Drawing Sheets

(56) References Cited

U.S. PATENT DOCUMENTS

| | | | |
|---|---|---|---|
| 6,967,462 B1 | 11/2005 | Landis | |
| 7,211,980 B1 * | 5/2007 | Bruemmer | G05D 1/0214 318/567 |
| 7,443,057 B2 | 10/2008 | Nunally | |
| 7,893,862 B2 | 2/2011 | Holly et al. | |
| 8,072,380 B2 | 12/2011 | Crouch | |
| 8,193,965 B2 | 6/2012 | O'Donnell et al. | |
| 8,511,606 B1 | 8/2013 | Lutke et al. | |
| 9,104,201 B1 * | 8/2015 | Pillai | G05D 1/0027 |
| 9,373,262 B2 * | 6/2016 | Stigler | B64B 1/10 |
| 2003/0075642 A1 * | 4/2003 | Silansky | B64B 1/02 244/30 |
| 2004/0143602 A1 * | 7/2004 | Ruiz | H04N 7/181 |
| 2005/0051667 A1 * | 3/2005 | Arlton | B64C 27/10 244/17.11 |
| 2007/0200027 A1 * | 8/2007 | Johnson | B64C 39/022 244/3.1 |
| 2007/0210953 A1 | 9/2007 | Abraham et al. | |
| 2007/0222665 A1 * | 9/2007 | Koeneman | G01S 13/9303 342/29 |
| 2007/0284474 A1 * | 12/2007 | Olson | G05D 1/0022 244/10 |
| 2008/0009969 A1 * | 1/2008 | Bruemmer | G05D 1/0027 700/245 |
| 2008/0009970 A1 * | 1/2008 | Bruemmer | G05D 1/0088 700/245 |
| 2008/0077284 A1 * | 3/2008 | Swope | G05D 1/101 701/5 |
| 2008/0276821 A1 * | 11/2008 | Stancil | F41G 3/02 102/502 |
| 2009/0087029 A1 * | 4/2009 | Coleman | G06K 9/00208 382/103 |
| 2010/0066587 A1 * | 3/2010 | Yamauchi | G05D 1/0044 342/70 |
| 2010/0243794 A1 | 9/2010 | Jermyn | |
| 2011/0011323 A1 * | 1/2011 | Wiggins | B63B 1/16 114/245 |
| 2011/0017865 A1 | 1/2011 | Achtelik et al. | |
| 2011/0143768 A1 * | 6/2011 | Lane | H04W 24/08 455/456.1 |
| 2011/0168838 A1 * | 7/2011 | Hornback | B64C 39/028 244/63 |
| 2012/0037059 A1 * | 2/2012 | Brenner | F42B 19/01 114/21.2 |
| 2012/0043411 A1 * | 2/2012 | Beck | B64C 39/024 244/3.24 |
| 2012/0044710 A1 * | 2/2012 | Jones | B64C 39/024 362/470 |
| 2012/0092208 A1 | 4/2012 | LeMire et al. | |
| 2012/0176239 A1 * | 7/2012 | Preden | H04Q 9/00 340/539.17 |
| 2012/0191269 A1 * | 7/2012 | Chen | G05D 1/0016 701/2 |
| 2012/0298839 A1 | 11/2012 | King et al. | |
| 2013/0070677 A1 * | 3/2013 | Chang | G01S 13/9303 370/328 |
| 2013/0081245 A1 | 4/2013 | Vavrina et al. | |
| 2013/0163619 A1 * | 6/2013 | Stephanson | G08C 15/02 370/537 |
| 2014/0032034 A1 | 1/2014 | Raptopoulos et al. | |
| 2014/0034775 A1 * | 2/2014 | Hutson | B64C 39/024 244/17.17 |
| 2014/0034776 A1 * | 2/2014 | Hutson | B64D 45/00 244/17.17 |
| 2014/0061376 A1 * | 3/2014 | Fisher | B60K 1/00 244/62 |
| 2014/0076642 A1 * | 3/2014 | Gettings | B25J 5/005 180/9.1 |
| 2014/0098990 A1 * | 4/2014 | Vian | G06K 9/00671 382/103 |
| 2014/0117147 A1 | 5/2014 | Hanna et al. | |
| 2014/0129059 A1 | 5/2014 | Scarlatti et al. | |
| 2014/0172194 A1 * | 6/2014 | Levien | G08G 5/0091 701/2 |
| 2014/0203140 A1 | 7/2014 | McGeer et al. | |
| 2015/0170524 A1 * | 6/2015 | Stefani | G08G 5/0013 701/120 |
| 2015/0204973 A1 * | 7/2015 | Nohara | G01S 13/426 342/107 |
| 2015/0225049 A1 * | 8/2015 | Fairfield | B63G 7/02 89/1.13 |

\* cited by examiner

GROUND SURVEY AND OBSTACLE DETECTION SYSTEM

TECHNICAL FIELD

The present invention relates to a ground survey and obstacle detection system using one or multiple detection devices.

BACKGROUND

Land transportation is a popular form of transportation. It is cheap and convenient relative to other forms of travel. Land transportation relies on vehicles such as automobiles, trucks, and armored vehicles, e.g., tanks. However, there are many problems associated with land transportation over difficult or unknown terrain, such as a warzone or a karst landscape. Obstacles such as explosives, sinkholes, and dangerous chemicals are often encountered during transportation across such terrains.

Explosives such as landmines or bombs are a serious threat to land vehicles. Bombs may be placed in or concealed on the ground. Landmines are often concealed on the surface of the ground or underground and designed to disable enemy targets as the targets pass near them. Landmines are typically detonated automatically by way of pressure from the target passing over. Landmines may also be detonated through a trigger mechanism. A landmine causes damages through direct impact from the blast or high speed fragments released from the blast. Similar to a landmine, an "improvised explosive device" (IED) or "roadside bomb" is constructed to cause damages through a blast. IEDs are often homemade and deployed in ways other than in conventional military activity. An TED may be constructed of conventional military explosives, such as an artillery round attached to a detonating mechanism. An TED may also be constructed from nontraditional materials.

Another type of obstacle is Karst landscapes. Karst landscapes are geological formations composed of soluble bedrock that frequently cause sinkholes to develop. Sinkholes are formed when natural erosion occurs beneath the top surface. When a land vehicle passes over a sinkhole, the top surface may collapse and the vehicle may sink in and become trapped.

A third type of obstacle is dangerous chemicals. When dangerous chemicals are concealed, they are also difficult to detect.

The present application discloses advanced methods and apparatus for ground survey and obstacle detection. The methods and apparatus disclosed herein can be used to prevent enemy attacks during transportation across hostile territories, to ensure safe passage through uncharted geographic regions, or to survey uncharted geographic regions.

SUMMARY

This summary is provided to introduce a selection of concepts in a simplified form that are further described below in the Detailed Description. This summary is not intended to identify key features of the claimed subject matter, nor is it intended to be used in determining the scope of the claimed subject matter.

The present disclosure is directed to a ground survey and obstacle detection system using one or multiple detection devices, for example, aerial detection devices. Aerial detection devices can be sent in front of a primary vehicle to survey the territory and map out any obstacles. An aerial detection device is equipped with one or more sensors configured to monitor the ground below and detect obstacles. After an obstacle has been detected, the detection device can alert the primary vehicle to the existence of obstacles. The detection device can also be configured to dismantle, mitigate, or neutralize the obstacles. Because an aerial detection device flies above the ground, it is less likely that the detection device will trigger or be affected by any of the aforementioned obstacles.

In some embodiments, the detection device may be configured to dismantle the obstacle either autonomously or under the control of the primary vehicle.

In the disclosure herein, aerial detection devices are used as an example to illustrate the advantageous technology of the present application. Other types of detection devices may include, but are not limited to, land-roaming, tunnel-burrowing, or wall-scaling devices that are designed to detect, but not to be affected by, any of the above mentioned obstacles.

One issue with using an aerial vehicle as the detection device is how to power the detection device for an extended period of time. Small-scale aerial vehicles typically run on batteries. Generally, the larger a battery is, the longer it lasts. Therefore, the flying time of these aerial vehicles is limited by the weight of the battery, which, in turn, is limited by the vehicles' load capacities.

In some embodiments, an electromagnetic radiation power transmission system is used to remotely re-charge the detection devices, allowing for an extended operating time of the detection devices. Other power supply methods are also disclosed in the present application.

In some embodiments, a charging system is used to charge one or more detection devices. The charging system may comprise a charging unit that includes an electromagnetic radiation power transmitter and laser range-finding device. Each detection device includes a battery, battery meter and electromagnetic radiation power receiver. In some embodiments, multiple detection devices are used to cover an area more quickly or to cover a wider area. In such case, the power transmission pattern includes a charging schedule for each detection device. The charging unit is configured to select a detection device among one or more multiple detection devices for charging according to a power transmission pattern. The power transmission pattern can be determined by a schedule input by a human operator or an autonomously-determined schedule based on the battery needs of the detection devices.

DESCRIPTION OF THE DRAWINGS

The foregoing aspects and many attendant advantages of the technologies disclosed herein will become more readily appreciated through reference to the following detailed description when taken in conjunction with the accompanying drawings.

DETAILED DESCRIPTION

Certain specific details are set forth in the following description and drawings to provide a thorough understanding of various embodiments of the invention. Certain well-known details often associated with computing and software technology are not set forth in the following disclosure to avoid unnecessarily obscuring the various embodiments of the invention. Furthermore, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

The present application discloses deploying one or more detection devices ahead of a primary vehicle to survey the territory, detect hidden dangers, and map out any obstacles. In some embodiments, an aerial vehicle is used as a detection device. An aerial detection device is configured to travel above the ground or in the air and is equipped with necessary sensors to scan the ground below and detect obstacles. One of the advantages of using an aerial detection device is that it does not usually come into contact with any of the aforementioned obstacles, and therefore does not trigger such obstacles. In addition, the aerial detection device has maneuverability advantages over a land-based detection device.

A detection device can be unmanned. An unmanned aerial detection device may also be referred to as an unmanned aerial vehicle (UAV). A UAV may be autonomous or under the control of the primary vehicle. In this way, human operators located in the primary vehicle can be kept outside of any potential danger zones.

Figure 1:
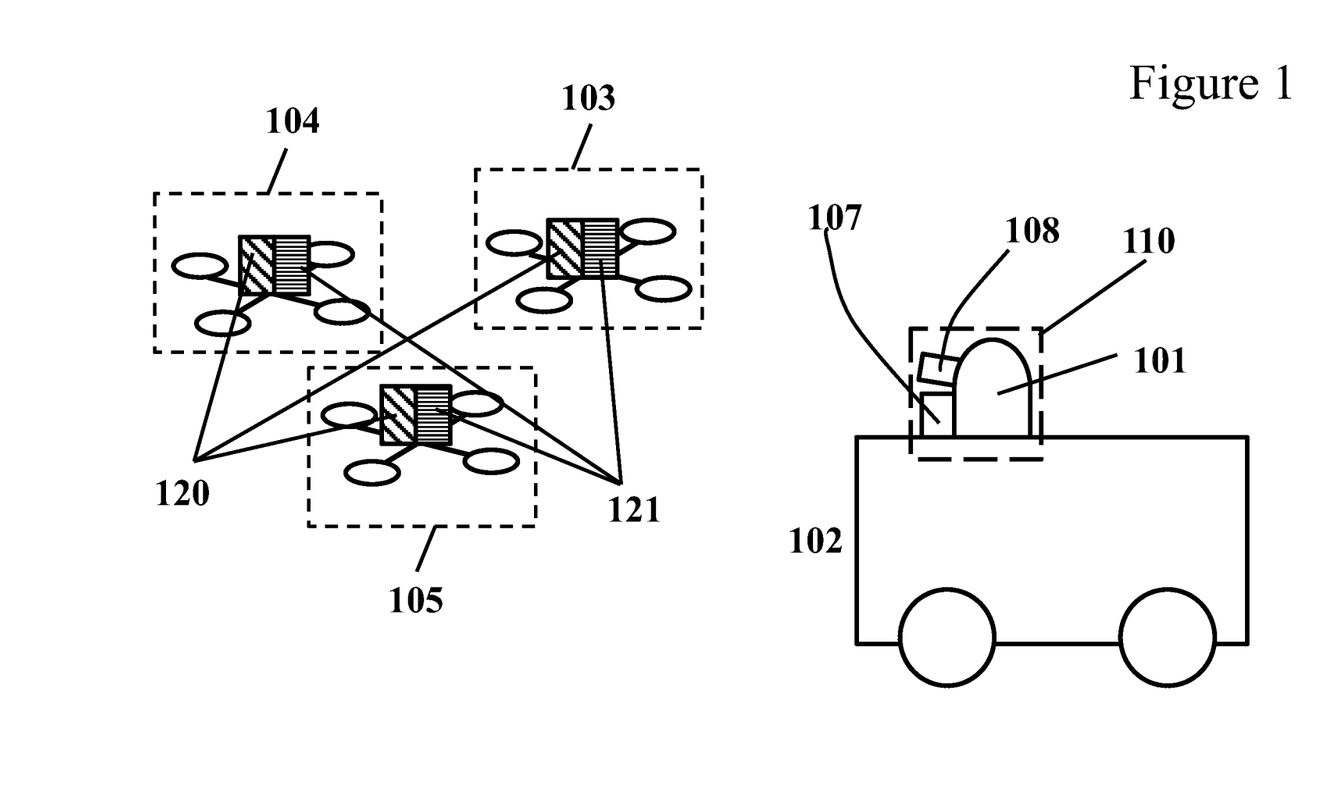
FIG. 1 illustrates an exemplary ground survey and obstacle detection system.

FIG. 1 illustrates an exemplary system for ground surveying and obstacle detecting using aerial detection devices. The ground survey and obstacle detection system in FIG. 1 includes a primary vehicle 102 and three aerial detection devices, 103, 104, and 105.

The primary vehicle 102 can be any transportation vehicle, for example, automobiles such as Humvee trucks, or tanks. The primary vehicle 102 comprises a base unit 110 that may include a central computer 101, a laser range-finding system 107, and an electromagnetic (EM) radiation transmitter 108.

The central computer 101 can be any commercially available computing system configured with sufficient processing power, memory, a wireless data transmitter/receiver, and Input/Output ports for connecting to peripherals.

The laser range-finding system 107 may be any of the commercially available laser range-finding systems. The laser range-finding system 107 uses a laser system to monitor or scan the ground ahead. In some embodiments, the laser range-finding system can be used to create a 3-D model of its surroundings. In some embodiments, the laser range-finding system can be used to control and monitor detection devices. The laser range-finding system 107 can be used to manage detection devices 103, 104, 105, for example, by measuring the positions of the detection devices 103, 104, 105, and directing them in the path ahead.

The EM radiation power transmitter 108 transmits electromagnetic radiation to deliver power to the detection devices 103, 104, 105. The EM radiation power transmitter 108 may be commercially available and already developed. A person skilled in the art would know that the EM radiation transmitters 108 can be replaced with inductive power transmission charging devices, or other types of remote charging techniques. With continuous or periodic power supply from the primary vehicle 102, the detection devices 103, 104, and 105 can operate for extended periods of time.

In FIG. 1, three detection devices 103, 104, and 105 are shown. But the number of detection devices can vary from one to many. In FIG. 1, the detection devices 103, 104, 105 are depicted as quadrotors. However, the detection devices 103, 104, 105 can be any type of aerial vehicle, either commercially available or custom developed, including but not limited to vertical takeoff and landing (VTOL) aircraft, and fixed-wing aircraft. VTOL aircraft include helicopters and quadrotors. In some embodiments, one type or different types of detection devices can be deployed at the same time.

Figure 2:
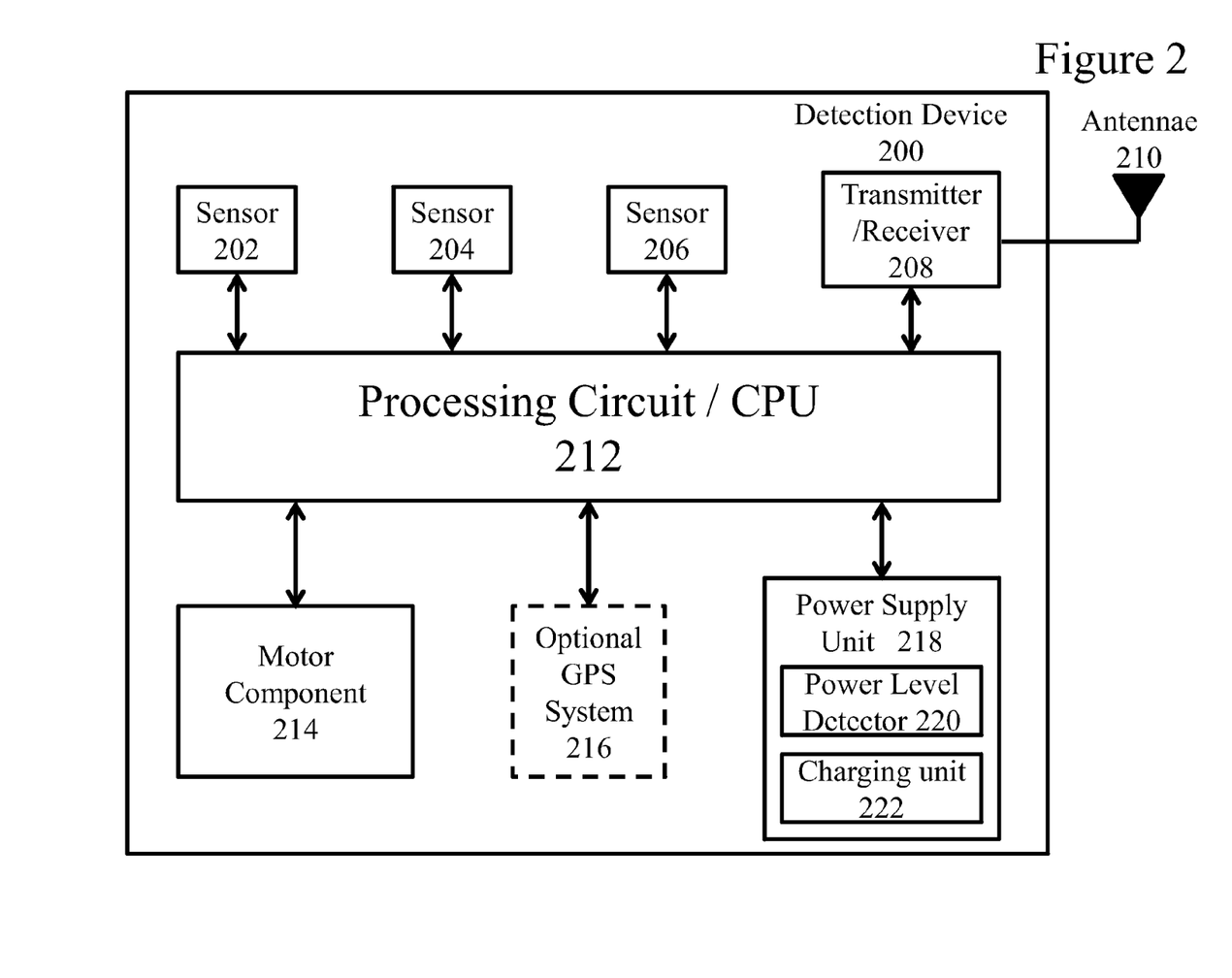
FIG. 2 illustrates a block diagram of an exemplary detection device.

FIG. 2 is a block diagram of an exemplary detection device 200 for ground survey and obstacle detection. The detection device 200 includes three sensors 202, 204, and 206. In some embodiments, a detection device 200 may include any number of sensors. The sensors 202, 204, and 206, may be of the same type or different types.

The detection device 200 also includes a transmitter/receiver 208, a processing circuit 212, a motor component 214, a power supply unit 218, and an optional GPS system 216.

The transmitter/receiver 208 may be connected to an antenna 210 and transmit data/commands to and receive data/commands from the primary vehicle 102. The processing circuit 212 is configured to control the various components of the detection device 200, which includes the sensors 202, 204, and 206, the motor component 214, and the power supply unit 218, etc. The processing circuit 212 is also configured to process commands received from the primary vehicle 102. The motor component 214 controls movements of the detection device 200. The detection device 200 can be configured to fly, walk, float or perform any other type of motion.

The power supply unit 218 may include one or more batteries (not shown), a power level detector 220, and a charging unit 222. The power level detector 220 is configured to detect if the power level of the batteries is low, and thus if they need to be charged through the charging unit 222. An example of the power level detector 220 is a battery meter. An example of the charging unit 222 is an EM transmission receiver 303 shown in FIG. 3.

In some embodiments, the detection device 200 may be configured to send a battery status or power level detected by the power level detector 220 to the primary vehicle 102. The battery status data can be used by the base unit 101 to determine an optimal charging pattern for the detection devices 103, 104, and 105. For example, the primary vehicle 102 may charge a detection device according to a predetermined timetable, or whenever the power level or battery level is below a certain threshold.

In some embodiments, the base unit 101 may be configured to charge a detection device 200 by beaming EM radiations at the detection device 200. In such embodiments, the base unit 101 may rely on the location data of the detection device 200, for example, provided by the laser range-finding system 107, to orient and position the EM radiation transmitter 108 accordingly. The location data of the detection device 200 may also be provided by the Global Positioning System (GPS) 216 installed on the detection device 200. The GPS 216 is optional. The GPS system 216 can be used, in lieu of or along with the laser range-finding system 107, to obtain location data of the detection device 200 or used to obtain location data for the objects or features detected by the detection device 200 while surveying the terrain.

In some embodiments, the detection device 200 may be implemented as a mobile improvised explosive device (IED) detector. A mobile IED detector can be deployed in front of an army vehicle traveling in a war zone. Such a mobile IED detector may be carried by a quadrotor aircraft or rotor helicopter equipped with a special sensor designed for detecting buried or hidden IEDs. A mobile IED detector can be made small and nimble with relatively low cost. A plurality of them can be deployed at once in order to provide coverage of a large geographic area.

Figure 3:
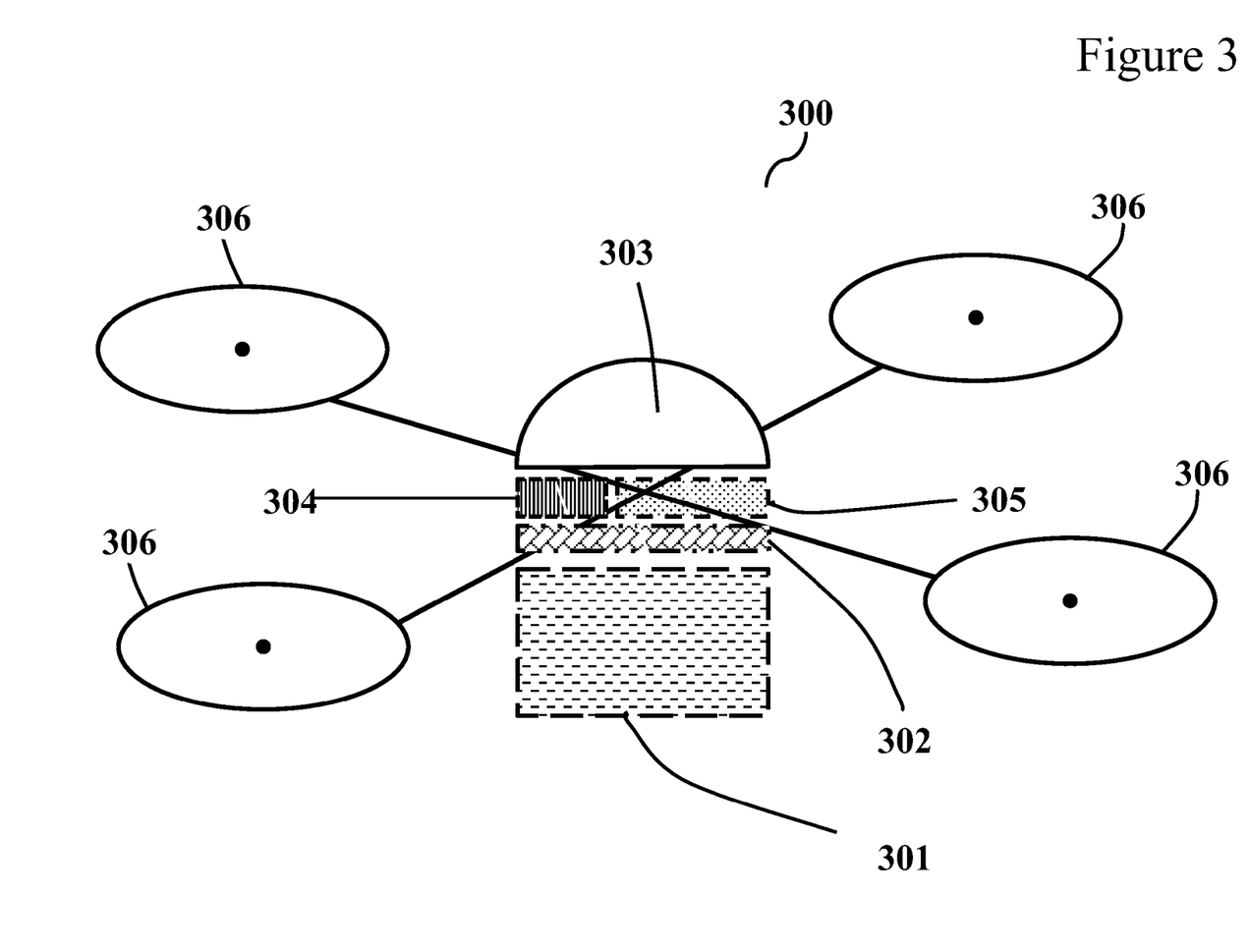
FIG. 3 illustrates the components of an exemplary detection device.

In some embodiments, the detection device 200 may be implemented as an aerial detection device 300 shown in FIG. 3.

The aerial detection device 300 in FIG. 3 is shown to include a microcontroller 302, an EM radiation power receiver 303, a sensor 301, a battery/battery meter 304, a GPS receiver 305, and a propulsion system 306. The microcontroller 302 controls movements of the aerial detection device 300 and manages the other components of the aerial detection device 300. The microcontroller 302 also includes a wireless data transceiver (transmitter/receiver) 208 (not shown in FIG. 3) for transmitting and receiving signals to and from the primary vehicle 102.

The sensor 301 is a threat sensor for detecting threats and obstacles in/on the ground ahead of the primary vehicle 102. The threat sensor 301 may include ground penetrating radar (GPR), an infrared sensor, a video camera, or others. These sensors are specially designed to detected unobservable threats by measuring variations in ground density, ground temperature, or electronic signal differentials. Electronic signal differentials appear in potential threats when they contain circuits or wires with current running through them; many explosive devices have triggers with electronic circuits or wires. In practice, one or multiple sensors can be mounted on each detection device. Different detection devices may be equipped with different types of sensors.

The battery and battery meter 304 stores power for the aerial detection device and reports the battery level to the microcontroller 302. The GPS receiver 305 receives location data from a remote global positioning system. The EM radiation power receiver 303 receives EM energy from the EM radiation transmitter 108 (shown in FIG. 1). The EM radiation power receiver 303 may be shaped as a semi-sphere such that charging of the aerial detection device 300 is not restricted in certain orientations relative to the EM transmitter 108. Other shapes of the EM radiation power receiver are also feasible or even desirable. The propulsion system 306 generates the lift needed to keep the detection device in flight and controls the motion of the aerial detection device 300. The propulsion system shown in FIG. 3 is that of a quadrotor, but other propulsion systems can be used as well.

Figures 4, 4B:
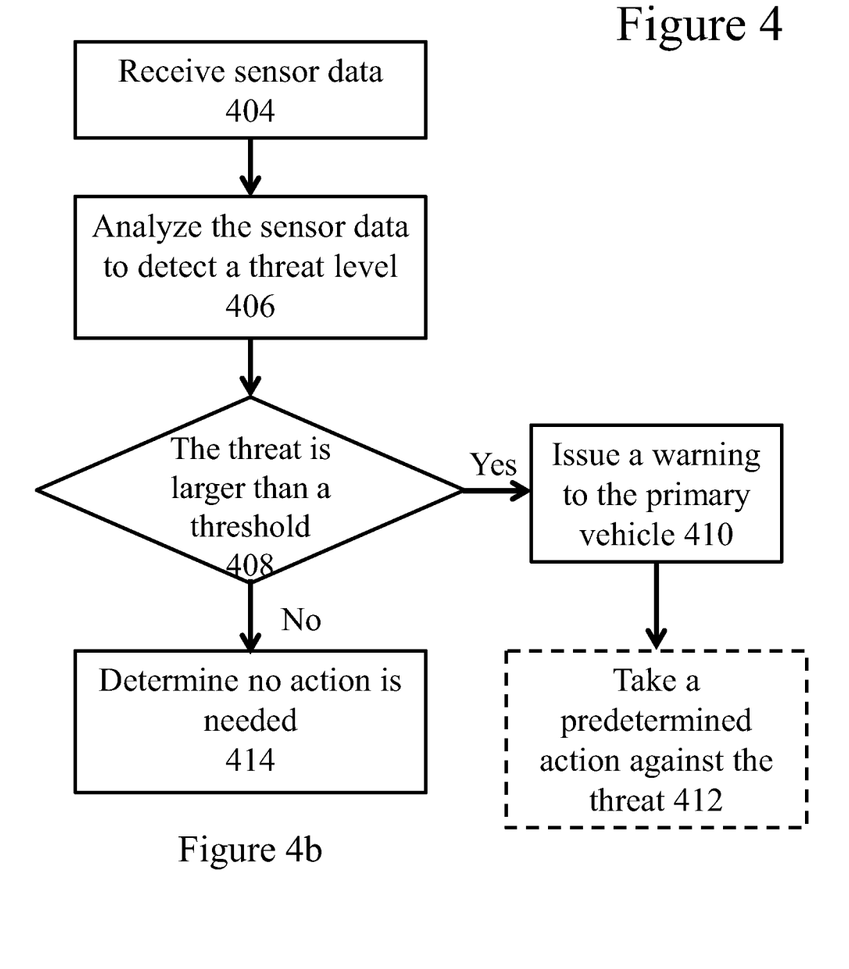
FIGS. 4a and 4b are flow charts illustrating exemplary detection processes in a detection device.
Figure 4A:
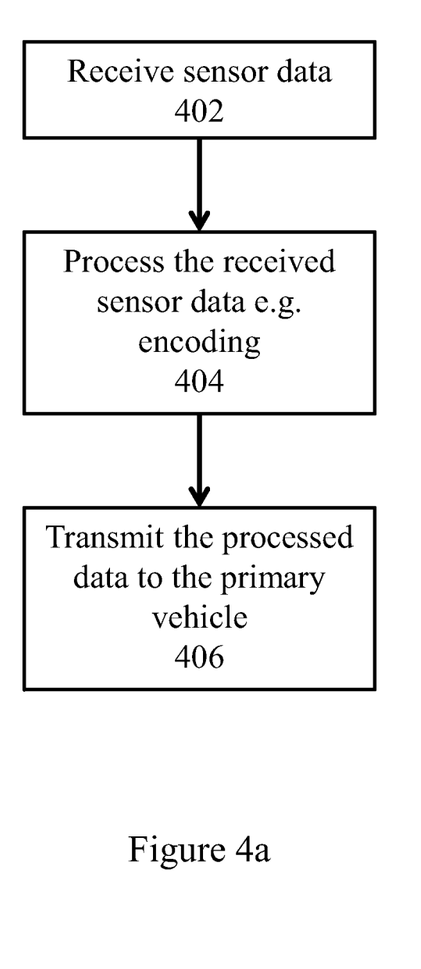

FIGS. 4a and 4b are flow charts that illustrate two exemplary detection processes in the detection device 200. In FIG. 4a, the detection device 200 receives sensor data from one or more sensors 202, 204, 206 (step 402). The detection device 200 processes the received sensor data, e.g., encoding or encrypting the data (step 404). The detection device 200 then transmits the processed data to the primary vehicle (step 406).

FIG. 4b illustrates another exemplary detection process in which the detection device 200 is configured to do more than issue a warning to the primary vehicle 102. In FIG. 4b, the detection device 200 receives sensor data (step 404) and analyzes the sensor data to detect a threat level (step 406). The threat level is compared to a threshold (step 408). The detection device 200 may decide that no warning is needed if the threat level does not exceed the threshold (step 414). If the threat level exceeds the threshold, the detection device 200 issues a warning to the primary vehicle (step 410). Upon receiving a warning from the detection device 200, the primary vehicle 102 may take a pre-determined action against the threat (step 412).

Figure 5:
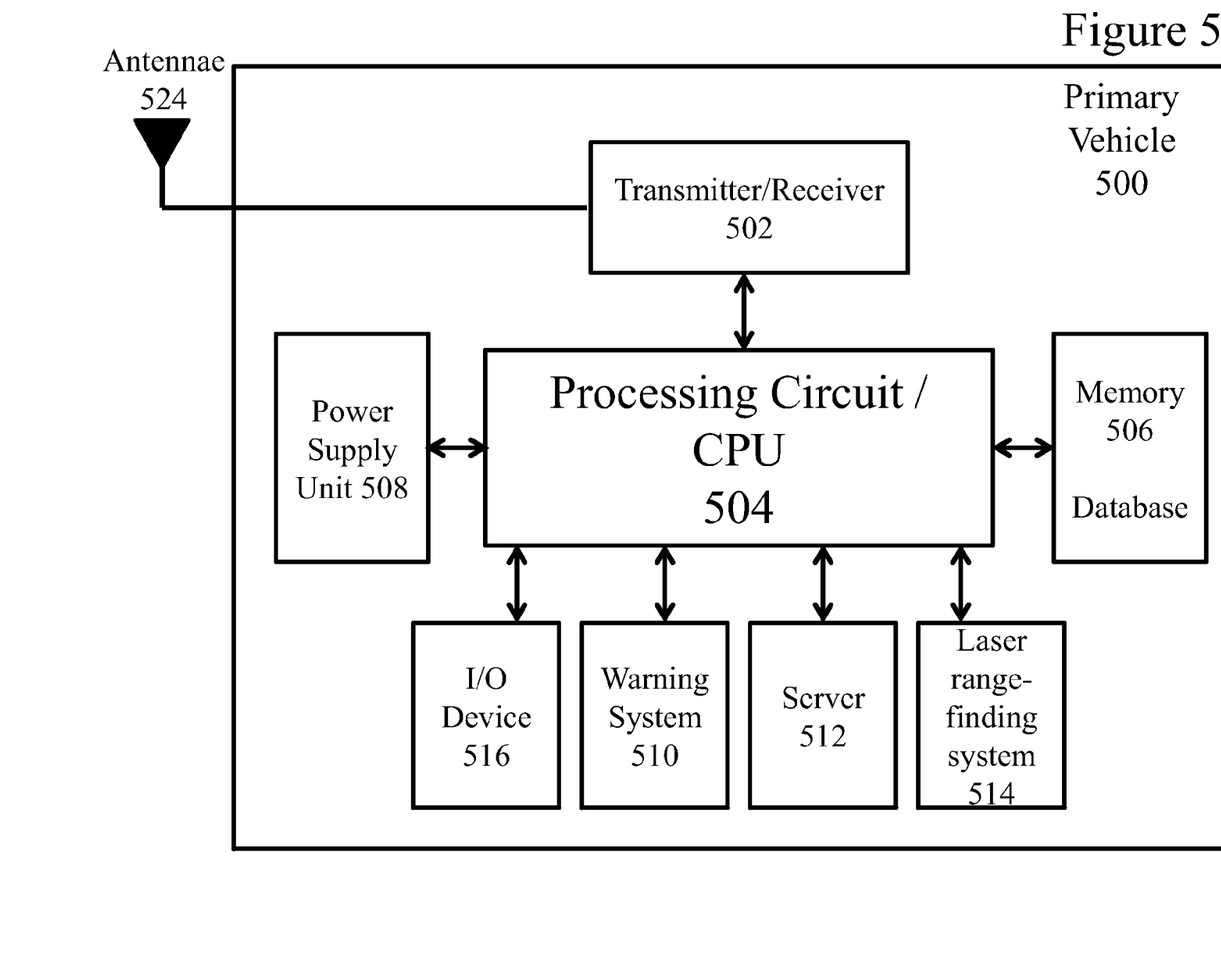
FIG. 5 illustrates an exemplary block diagram of a primary vehicle.

FIG. 5 illustrates an exemplary primary vehicle 500. In FIG. 5, the primary vehicle 500 includes a transmitter/receiver 502, processing circuit/CPU 504, memory 506, power supply unit 508, server 512, laser range-finding system 514 (optional), warning system 510, and I/O device 516.

The transmitter/receiver 502 is connected to an antenna 524 and is configured to communicate with the detection device 200. The data received from the detection device 200 is forwarded to the processing circuit 504. The processing circuit 504 also issues commands or provides information to the detection device 200 through the transmitter/receiver 502. The processing circuit 504 is connected to the memory 506, which may include a database for storing survey data, maps, and other relevant information. The processing circuit 504 is also connected to the power supply unit 508 which provides power supply to the detection device 300. An example of the power supply unit 508 is the EM radiation transmitter 108 shown in FIG. 1, or the battery charger 902 shown in FIG. 9.

When multiple detection devices are deployed, the power supply unit 508 needs to supply power to the multiple detection devices. In some embodiments, the power supply unit 508 may be implemented as a charging system that comprises a charging unit. The charging unit includes an electromagnetic radiation power transmitter and laser range-finding device. The charging system supplies power to the multiple detection devices according to a power transmission pattern. The power transmission pattern includes a charging schedule for each detection device. The charging unit is configured to select a detection device among one or more multiple detection devices for charging according to the power transmission pattern. The power transmission pattern can be determined by a schedule input by a human operator or an autonomously-determined schedule based on the battery needs of the detection devices.

The processing circuit 504 may also be optionally connected to the I/O device 516, the warning system 510, the server 512, and the laser range-finding system 514. In FIG. 5, the server 512 is shown to be located on the primary vehicle 500. The server 512 may be located remotely. If the server 516 is remote, the processing circuit 504 may communicate with the server 512 via a long distance wireless connection, such as mobile satellite communications.

Figure 6:
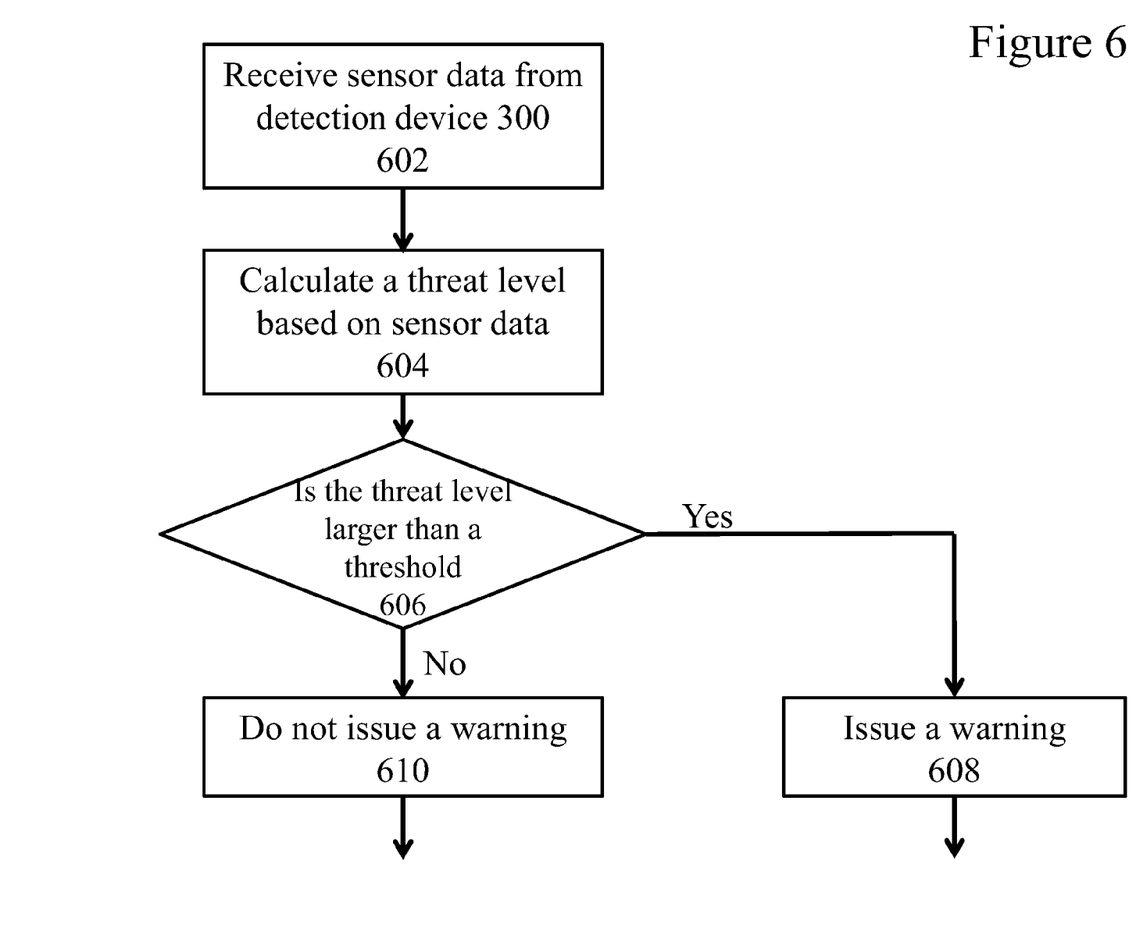
FIG. 6 is a flow chart illustrating an exemplary control process in a primary vehicle.

FIG. 6 illustrates an exemplary process to be executed on the primary vehicle 500. In FIG. 6, the primary vehicle 500 receives sensor data from a detection device 300 (step 602). The primary vehicle 500 may calculate a threat level based on the sensor data (step 604) and compare the threat level to a threshold (step 606). If the threat level exceeds the threshold, a warning may be issued through the warning system 510 (step 608). If the threat level does not exceed the threshold, no warning may be issued (step 610). As explained above, in some embodiments, the detection device can directly issue a warning message to the primary vehicle after calculating the threat level and comparing the threat level to the threshold.

The communication between the primary vehicle 500 and the detection device 200 can be carried out over a number of different wireless data communication methods ranging from short-range to long-range types. Wireless local area networks such as Wi-Fi and Bluetooth could both transmit wireless data at a maximum transmission range of about 100 feet. Cellular data service can offer data transmission coverage at ranges of up to 20 miles from the cell site. Mobile satellite communication technologies can transmit data anywhere on earth. Even farther, a detection device could use a high-frequency X-band radio wavelength to communicate with the central computer thousands of miles away. The invention presented here would typically use short-range data transmission methods including Wi-Fi and Bluetooth.

Figure 7:
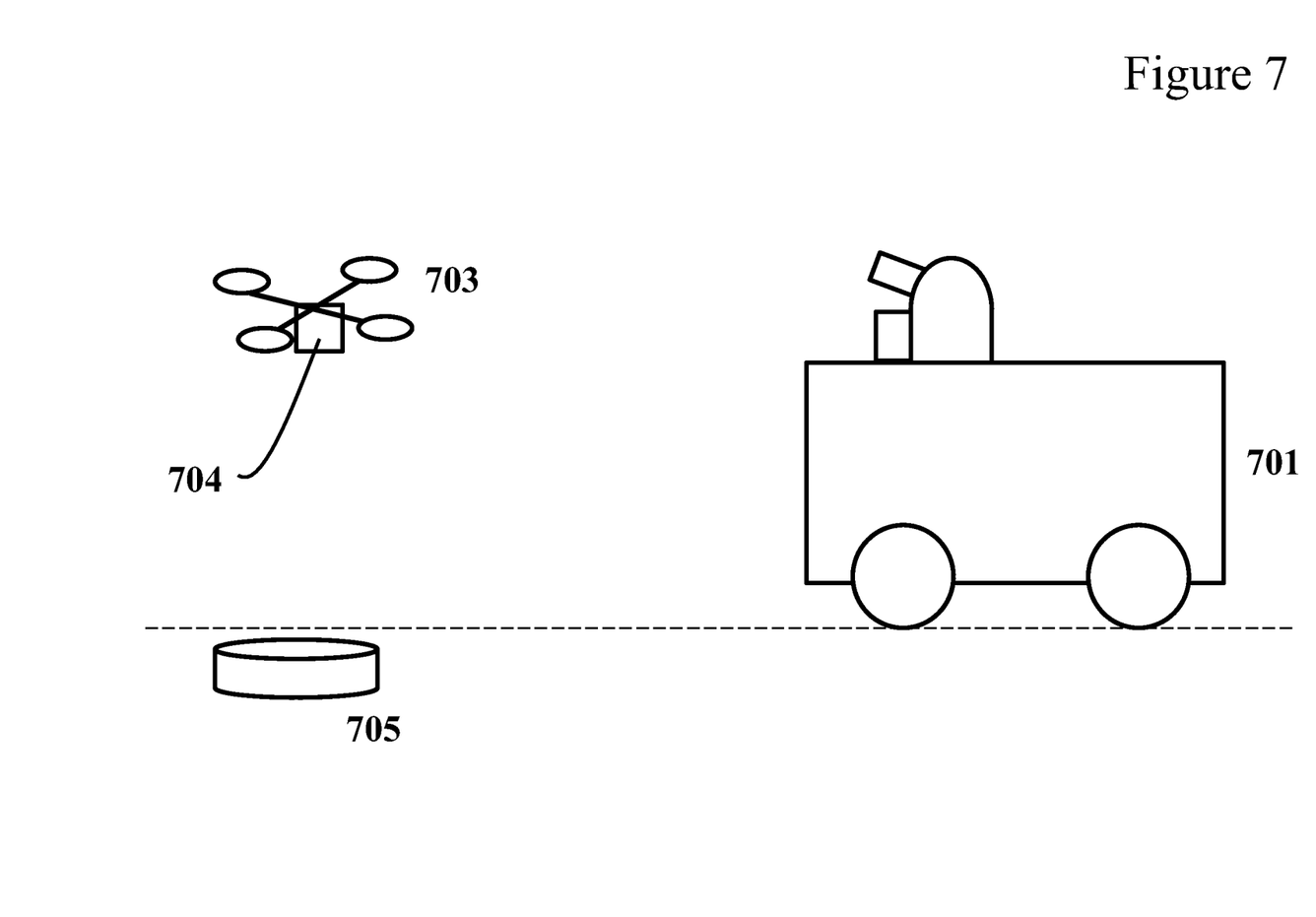
FIG. 7 illustrates an exemplary use case showing a detection device detecting and locating obstacles and threats in the vicinity of the primary vehicle.

FIG. 7 illustrates an exemplary use case of the ground survey and obstacle detection system disclosed herein. The system includes a primary vehicle 701 and a detection device 703. The detection device 703 is equipped with one or more sensors 704, such as ground penetrating radar, night vision detector/sensor, or infrared sensors for detecting threats such as landmines and IEDs 705. Upon detecting the threat 705, the detection device 703 transmits the GPS coordinates of the threat 705 to the primary vehicle 701. The primary vehicle 701 may store the GPS coordinates into the database (506 shown in FIG. 5) or send the GPS coordinates to the server 512 for further actions or removal. In FIG. 7, the detection device 703 flies ahead of the primary vehicle 701 so any potential threats can be detected early and avoided. In some embodiments, multiple detection devices can collaborate and work in conjunction with each other.

In some embodiments, the calculation of the probability of a potential threat may be carried out by the primary vehicle 701. In other embodiments, the calculation may be carried out by the detection device 703. The calculated probability may be compared to a threshold to determine whether a warning is warranted. The comparison may be performed by the detection device or the primary vehicle. If the comparison is performed by the detection device and the detection device determines that the probability of a potential threat exceeds a threshold, it may issue a warning message to the primary vehicle. The primary vehicle, upon receiving the warning message, may gather necessary data, such as the location of the threat, before generating an alarm to alert human operators or sending an alert message to a server. A team may be dispatched from the primary vehicle 701 to neutralize or dismantle the threat. Alternatively, the detection device 703 may be configured to mitigate or neutralize the threat itself, either autonomously or under the command of the primary vehicle 701.

Figure 8:
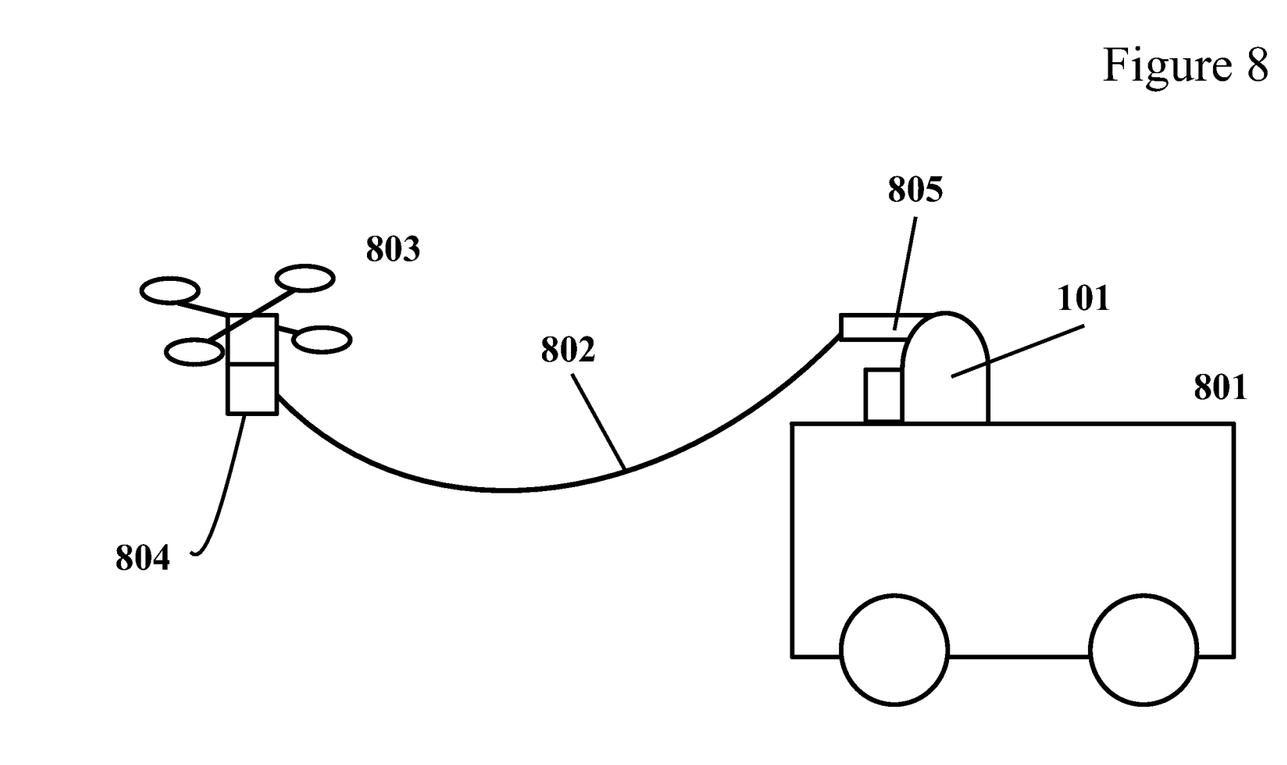
FIG. 8 illustrates an exemplary power supply system for powering and controlling an aerial detection device using a physical cable.

FIG. 8 illustrates an alternative power supply system installed on a primary vehicle 801 for powering and controlling an aerial detection device 803 using a physical cable 802. The electromagnetic radiation transmitter 108 on the base unit 101 and the electromagnetic radiation receiver 303 on the detection device 300 are replaced with the power cable 802. The power cable 802 connects the battery 804 of the aerial detection device 803 to the power source 805 of the base unit 101. This power cable 802 is sometimes referred to as a tether. The power source may be direct current (DC) or alternating current (AC).

In some embodiments, data between the detection device 803 and the primary vehicle 801 can be transmitted through the use of a data transmission wire. The data transmission wire may share the same physical cable with the power cable 802 or use a physical cable separate from the power cable 802. When using a separate physical cable, the data transmission wire may share its housing with the power cable 802.

Figure 9:
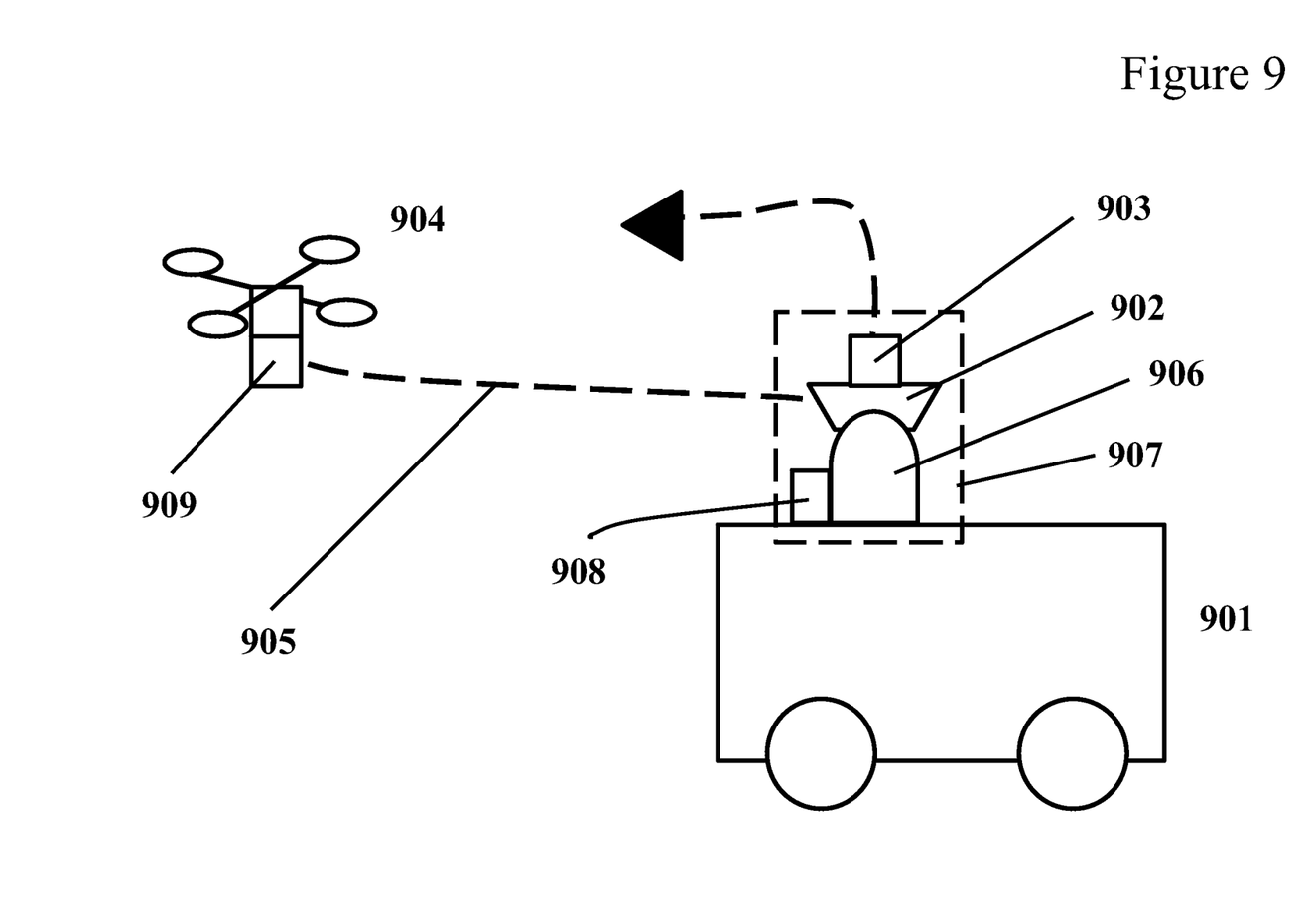
FIG. 9 illustrates an alternative power supply system for powering the aerial detection device using a battery charger mounted on the primary vehicle.

FIG. 9 illustrates yet another alternative power supply system for powering the aerial detection device 904. The power supply system shown in FIG. 9 comprises a battery charger 902 mounted on the primary vehicle 901 which includes a central computer 906, a base unit 907, a laser range-finding system 908, and a charged backup battery 903. The aerial detection device 904 carries a detachable rechargeable battery 909. The battery charger 902 on the primary vehicle 901 may charge more than one battery at a time. When the battery charge of the detection device 904 is low, the detection device 904 returns to the primary vehicle 901 for re-charging its battery 909. The detection device may remain with the primary vehicle 901 while the battery 909 is charged by the battery charger 902. Alternatively, the detection device 904 can drop its depleted battery 909 and pick up a freshly charged battery 903. A variety of methods are known for swapping batteries while keeping the detection device powered. The battery of the detection device may be swapped by an automatic mechanism or manually. There is no limit to how many charging batteries or charging aerial detection devices each system may use. The battery charger 902 may be configured to charge two or more batteries simultaneously. Although the present application discloses several exemplary charging methods using EM radiation, a physical power line, and battery charger to power the detection device, it is not intended that the disclosure be limited to these power supply methods.

Although the present system has been described as a threat detection system, it is not intended that the disclosure be limited to this application. This system could be used for other applications. For example, it can be used to survey unexplored territories, particularly territories that are potential construction sites. It can be used to examine potential construction sites that require density differential inspections of the ground to determine stiffness, composition, and other characteristics indicating viability of construction. It can be used to locate and uncover potential objects in the ground that may pose as obstacles during construction. It can be used as a pollution monitoring system to monitor and measure pollution levels for environment protection applications. It can be used as a border security device to check for the presence of underground tunnels. It can be used to check for the presence of underground water. It can be used for geological terrain mapping for cartographic purposes. It can be used to detect underground pipes and power lines. Finally, while the systems described herein show surveying territory in front of the primary vehicle, the techniques can also be feasibly used to survey territory behind and next to the primary vehicle.

What is claimed is:

1. A detection device deployed by a primary vehicle for surveillance and threat detection, comprising:
   a transceiver for transmitting and receiving data from the primary vehicle;
   a power supply unit configured to receive power from the primary vehicle and supply power for the detection device;

a motor component for controlling aerial movement of the detection device;

a charging unit comprising an electromagnetic power receiver configured to wirelessly receive electromagnetic energy that is sent from the primary vehicle to charge the power supply unit to supply power to the motor component to elevate the detection device;

one or more sensors for detecting a pre-defined object; and processing circuits configured to process sensor data received from the one or more sensors and determine a threat level based on the sensor data of the detected object.

2. The detection device of claim 1, wherein the detection device and the primary vehicle are connected through a cable, and wherein the cable is used for supplying power to the detection device.

3. The detection device of claim 1, wherein the power supply unit comprises a battery and a power level detector to detect the power level of the power supply unit, and wherein the power supply unit is configured to determine whether the battery needs recharging.

4. The detection device of claim 1, further comprising a Global Positioning System (GPS) for determining location data of the detected object.

5. The detection device of claim 1, wherein the processing circuits are configured to transmit the determined threat level to the primary vehicle through the transceiver.

6. The detection device of claim 1, wherein the processing circuits are configured to compare the determined threat level to a threshold and issue a warning message to the primary vehicle only when the determined threat level exceeds the threshold.

7. The detection device of claim 1, wherein the motor component comprises a quad rotor propulsion system.

8. The detection device of claim 1, wherein one of the one or more sensors is a ground penetrating radar.

9. The detection device of claim 1, wherein the electromagnetic power receiver comprises a semi-sphere shape to receive transmission of the electromagnetic energy from the primary vehicle over a wide range of orientations relative to the primary vehicle.

10. A ground survey and obstacle detection system, comprising:

one or more aerial detection devices, each of said one or more aerial detection devices comprising:

one or more sensors for scanning the ground below the aerial detection device and detecting a pre-defined object;

a propulsion system with a motor and a rotor to elevate the aerial detection device above the ground for controlling a movement of the detection device above the ground, the propulsion system configured to elevate the aerial detection device independently from a primary vehicle;

a transceiver for transmitting and receiving data;

a power supply system comprising an electromagnetic power receiver to wirelessly receive power from the primary vehicle when spaced away from the primary vehicle and for supplying power to the propulsion system of the aerial detection device to elevate the device; and processing circuits for controlling and managing the aerial detection device;

the primary vehicle comprising:

a transceiver for communicating data with the one or more aerial detection devices;

a charging unit for remotely and wirelessly re-charging the one or more aerial detection devices, the charging unit comprising a power transmitter that transmits the power to the one or more aerial detection devices to power the propulsion system to elevate the one or more devices; and a central processing unit for managing and controlling the one or more aerial detection devices;

wherein the one or more aerial detection devices are configured to detect the pre-defined object and calculate a threat level of the detected object based on data from the one or more sensors regarding the detected object; and wherein the primary vehicle is configured to receive the calculated threat level from the one or more aerial detection devices.

11. The ground survey and obstacle detection system of claim 10, wherein the propulsion system of one of the one or more aerial detection devices is a quad rotor propulsion system.

12. The ground survey and obstacle detection system of claim 10, wherein the one or more aerial detection devices is equipped with a ground penetrating radar.

13. The ground survey and obstacle detection system of claim 10, wherein the primary vehicle is configured to issue a command to direct the one or more aerial detection devices to dismantle the detected object after determining the calculated threat level received from the one or more aerial detection devices exceeds a threshold.

14. The ground survey and obstacle detection system of claim 10, wherein the primary vehicle receives sensor data from the one or more aerial detection devices and calculates the threat level based on the received sensor data.

15. The ground survey and obstacle detection system of claim 10, each of the one or more aerial detection devices are configured to return to the primary vehicle for re-charging in response to the corresponding power supply system detecting that the power supply is below a predetermined threshold.

16. The ground survey and obstacle detection system of claim 10, wherein the one or more aerial detection devices are configured to send to the primary vehicle a power level status that is detected by the power supply system.

17. The ground survey and obstacle detection system of claim 10, further comprising the primary vehicle configured to receive location data from the aerial detection devices to orient and position the devices during wireless charging.

18. The ground survey and obstacle detection system of claim 17, wherein the electromagnetic power receiver comprises a semi-sphere shape to receive transmission of the power from the primary vehicle over a wide range of orientations relative to the primary vehicle.

* * * * *